May 13, 1969 H. KLEINERMANNS 3,444,017
PROCESS FOR MAKING A PILE FABRIC
Filed Oct. 21, 1965

INVENTOR
HUBERT KLEINERMANNS
by
Jacob L. Kollin
ATTORNEY

May 13, 1969 H. KLEINERMANNS 3,444,017
PROCESS FOR MAKING A PILE FABRIC
Filed Oct. 21, 1965
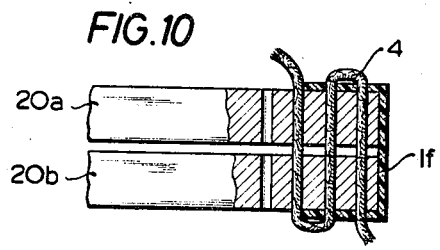
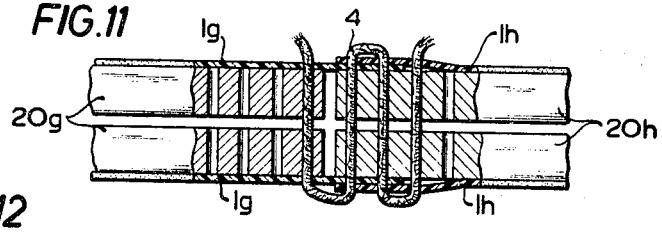
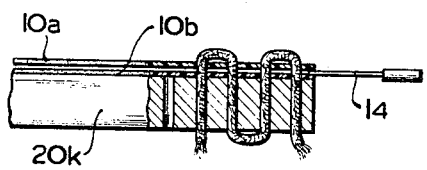
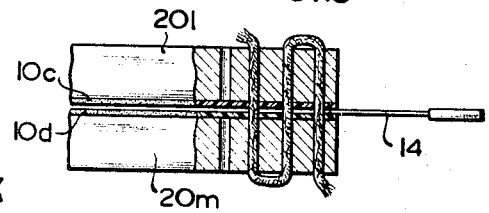
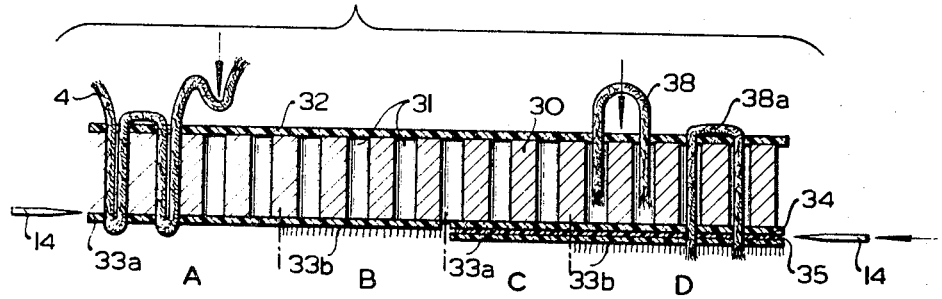
INVENTOR
HUBERT KLEINERMANNS
by Jacob L. Kollin
ATTORNEY United States Patent Office 3,444,017
Patented May 13, 1969

3,444,017
PROCESS FOR MAKING A PILE FABRIC
Hubert Kleinermanns, 21–23 Bogenstrasse,
2057 Reinbek, Germany
Filed Oct. 21, 1965, Ser. No. 499,765
Claims priority, application Germany, Oct. 24, 1964,
K 54,344; Apr. 23, 1965, K 55,897; Sept. 30, 1965,
K 57,265
Int. Cl. D04h 11/04, 11/08
U.S. Cl. 156—72       8 Claims

ABSTRACT OF THE DISCLOSURE

Method of making pile thread rugs, comprising repeatedly passing in opposite directions a continuous length of pile thread through adjacent perforations in a plate member having a thickness corresponding to the length of the desired pile to thereby form a plurality of rows of loops on both sides of the plate member, glueing together the loops on one side of the plate member to form a pile thread web, severing the loops on the other side of the plate member along a predetermined plane and withdrawing the thread web from the plate member.

---

Figure 1:
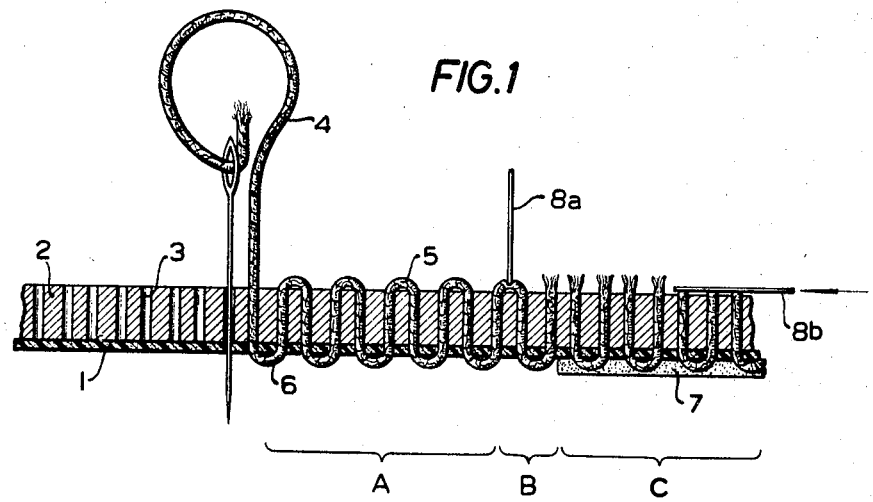

In the manufacture of pile thread products, such as rugs, wall coverings etc., there are employed weaving as well as so-called "knot" or "loop" techniques, in which the pile threads are individually locked. This method requires an extremely great time expenditure and a needlessly high consumption of pile threads for the complete rug due to the fact that a part of the pile thread must have a particular loop length. A high consumption of pile thread results necessarily and frequently because the pile threads must be long in order to make possible the knot loops, which are shortened then to the desired lengths. Heretofore it has not always been possible to loop pile threads at right angles which loops were then cut lengthwise. In order to achieve an even surface, the pile threads had to be cut in individual lengths or the entire rug had to be trimmed.

The object of the invention is to provide a method by means of which the above described type of rugs may be manufactured in a simpler and considerably quicker manner and the consumption of material considerably reduced. These methods can particularly be carried out by laymen according to the "do-it-yourself" method and do not require any costly apparatus.

The method has substantial advantages. It can be carried out by untrained persons in a very simple manner. It permits the making of a rug quicker and with a lesser use of material even with complicated designs by untrained persons, without the necessity of an exact count of the original design.

By doing away with the heretofore required knotting and looping of the pile thread, there is effected a saving of material up to 50%, because instead of a long complicated loop path, there is only required a U-shaped bending. Since the pile threads may be inserted with a needle through the work plate just as in sewing, there results about a double a tripple looping. Since, in contrast to known techniques, at least two threads may be directly inserted with the needle, without affecting the quality or appearance of the rug, the work speed is at least doubled and may even be quadrupled or sextupled. By using a pair of superimposed work plates, the speed may again be double so that the work speed according to the invention is increased ten times in practical use. A further increase in speed results from the fact that, in contrast to the known methods in which the rug had to be prepared to an exacting pile order and certain measurements and in which the colors of the pile threads had to be changed frequently according to the individual pile order, the invention may be carried out with one long thread of a single color, according to the design on the work plate, in each plate direction, to a desired length. As a result, each color component of the design may be manipulated on the entire surface without difficult or time-consuming exchange of colors, until its completion.

The pile threads may also be introduced continuously and individually or in the shape of a loop form into the work plate and the pile thread points or loop points may inserted into a material net which is mounted on the other side of the plate such as sheets or netting which due to their attributes will prevent the pile threads from sliding back. When manipulated in this manner, the pile threads need not be drawn to the work plate from one side and subsequently drawn back again from the other side. The work plate and/or a material backing secured thereon may be made of a material possessing attributes or properties which prevent the backsliding of the pile threads. The plate holes, for example, may have a cross-section which adheres to the pile threads, or a material with retarding properties, such as polyurethane foam, may be employed. The material backing may have a repeating hook-like structure, and in particular an electrostatically charged structure.

Heretofore it has been extraordinarily difficult to make pile threads of the same length, requiring considerable manual dexterity and thus leaving the success of the entire work in question. The use of the work plate according to the invention results in a positive even pile height of all the pile threads, without employing any skill and preparation. While the carrying out of previous techniques was tiring and could be continued for a limited time, the method according to the invention requires no expenditure of strength and makes it possible to continue the work for many hours, without interruption.

The pile thread loops may be secured to one another by suitable materials, rigidly or elastically, e.g., with suitable plastics, synthetics, single or multiple component glues etc. To increase the holding quality, there may be added to these materials substances such as e.g., fibers, thread ends etc. Furthermore, the work plate may be covered with a carrying material, e.g., a web or a sheet through which the pile threads may be let through. The pile threads may, for example, be glued to the carrier material by suitable substances, whereby the rug will additionally be made slip-resistant.

Instead of a single large, heavy, unwieldy work piece, there can be employed a separate light work piece and large rugs may thereby be manufactured in small spaces effortlessly. The joining of the pieces may be made in various ways, e.g., by first joining the previously prepared work plate parts, while the edges may also be prepared with a self-adhering substance. Dowel pins facilitate the joining of the pieces. Finally the carrying materials of the partial pieces are united by joining overlapping strips of the carrying material, for example by glueing these together or by glueing strips in advance, superimposing these one on the other and subsequently drawing the pile threads through these.

When working with two or more work plates, pile threads are pulled through simultaneously through several plates with or without carrying material and are cut open between the other surfaces of the work plate after they are pulled through. With the use of two plates it is sufficient, for example, to prepare only one rug which is cut open between the plates and may be opened like a book thus resulting in a complete rug. The carrying materials may at the same time be wrapped around the superimposed work plate so that the parts are joined together. The area which is free of pile threads as a result of this arrangement may be formed into folds and joined, glued or secured in a simple manner. Additionally pile threads may also be drawn into the free area while intermediate strips are inserted between the work plates. By cutting between the plates it is also possible to produce several rugs in one operational cycle. The saving of material is further increased, while the threads are cut smoothly and without delay.

The work plate may also consist of material which permits the passage and/or the drawing through of pile threads, for example, a hard foam synthetic material e.g. foamed polystyrene, or a soft cardboard material. It may also be provided completely or partially with shreds which may be arranged according to a pattern and marked with different colors. This channel-like guidance of the needle and the threads excludes diagonal stitches and does not require skill and preparation. Its great advantage is an absolute exactness and clearance of design of the entire rug surface, because the pile threads are placed exactly at the points required by the pattern, due to the exact dimensions of the pile thread lengths. When using hard substances, the holes are made directly, during the molding process. Styrofoam is inexpensive and is pleasant to handle. The length of the pile threads is determined by the chosen thickness of the plate and the automatic cutting of pile threads; there is effected a completely unachievable heretofore precision cropping, measured in millimeters. The work plate may be covered with a cut-resistant sheet or with a hard lacquer covering, so that the knife will be guided with exactness during the trimming of the pile threads.

The carrying material may be secured to the work plate with glue provided with grooves or depressions so that glue is not spread over the entire contact surface. Thus, when using a carrier material, such as a woven fabric, it may be pierced easily through the individual woven threads and may be loosened relatively easily after completion. The work plates or the carrier material may be provided with stitch/markings or with a pattern sheet which may be glued thereon. At the same time inlays for dividing or arranging the colors may be made.

Further features of the invention will become apparent from the drawing in which are illustrated several embodiment examples.

Figure 2:
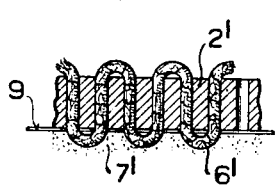
Figure 3:
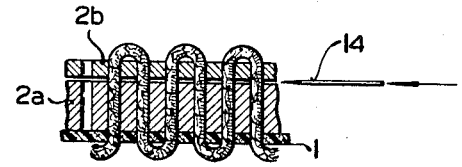
Figure 4:
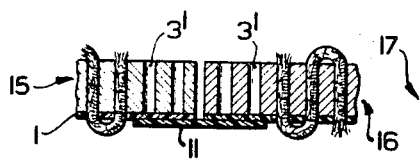
Figure 5:
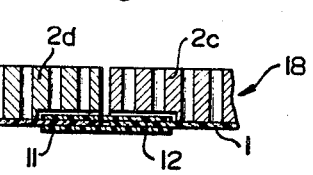
Figure 6:
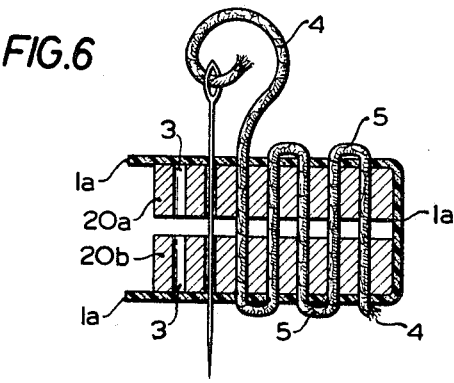
Figure 7:
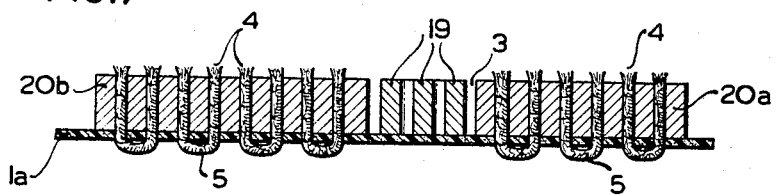
Figure 8:
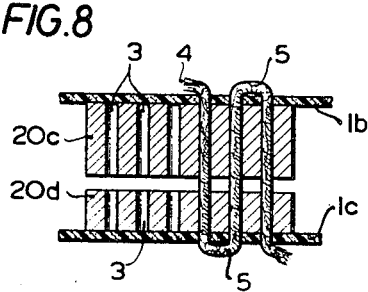
Figure 9:
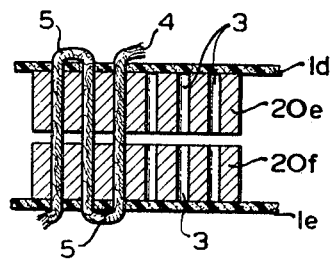

In the drawings,

FIG. 1 is a schematic representation of the method of carrying out the invention, FIGS. 2 and 3 are schematic representations of modified methods, FIGS. 4 and 5 illustrate the possibilities of arranging joining strips for two adjacent pieces of rugs, FIG. 6 illustrates a simultaneous manufacture of two surface sections of a rug piece, FIG. 7 is an unfolded rug piece produced according to FIG. 6, FIGS. 8 and 9 illustrate the simultaneous making of two rugs using work plates of two different or equal thicknesses, FIG. 10 shows the special method of using the carrier material, FIG. 11 shows a special manner of joining of work plate pieces, FIGS. 6, 12 and 13 illustrate the securing of cut-resistant sheets in a single plate and in a double plate system and FIG. 14 is a schematic representation of another method of carrying out the invention.

In FIG. 1 the numeral 1 indicates the carrying or backing material which may consist e.g. of a web, foam material, rubber or the like. A work plate 2 is laid on the carrying material, which may be glued on lightly. The work plate is provided with holes 3 for the threads which are arranged according to the design of the rug. The pile threads 4 are drawn in the thread holes 3 and in the backing material 1 by a needle which is led back and forth as in stitching, so that upper and lower pile thread loops 5 and 6 are disposed adjacent one another on the upper side of the work plate and of the under side of the backing material. After the pile threads are drawn through, loops 5 are cut open with a cutting tool 8a or 8b, either parallel or at right angles to the work plate (sections B, C), so that the one pile thread surface consists of a cut away pile thread (section C). The pile thread loops 6, disposed on the underside of the backing material, may be secured with an adhesive substance 7. Finally, the work plate 2 is pulled away from the backing material, whereby the making of the rug is substantially completed.

FIG. 2 illustrates a modification in which no backing material is employed. The pile thread loops 6', disposed on the underside, are provided with a glue substance 7' before the removal of the work plate 2, said glue substance providing the required joining of all the pile threads. To prevent plate 2 from being glued to the pile threads during the glueing cycle, the plate is provided with a thin separation sheet or film 9.

FIG. 3 illustrates a modification of FIG. 1, wherein two plates 2a, 2b are imposed upon the backing material 1. Here the pile threads between both work plates are cut with a long knife 14, so that an absolutely precise pile thread length is provided.

FIG. 4 illustrates the joining of a pair of rug pieces. The adjoining portions of the rug pieces 15, 16 are underlaid with the joining strip 11 loosely glued thereto, said piece underlaying the lower surface of the edge area which is free of pile threads i.e. thread holes 3'. After the joining strips 11 are laid, the remaining pile threads are drawn through the thread holes 3 into the joining strips and the rug parts are thereby securely joined.

FIG. 5 illustrates the joining of edge areas of two rug parts using perforated work plates 2c, 2d, by means of joining strips 11, 12, wherein there are provided recesses for the joining strips.

According to FIGS. 6 and 7, a pair of work plates 20a, 20b, are laid on one another and the common piece of backing material 1a is wrapped around the side edges of one side of the work plates. Pile threads 4 are now pressed from above and vice-versa into the thread holes 3. After the loops 5 are completely drawn through, the upper and lower loops 5 are secured to one another or to the backing material by coating or imbedding in a suitable joining substance. Finally the pile threads are tucked through between the inner faces of both work plates 20a, 20b, and the upper work plate 20a is folded to the right sideways, just like a book (FIG. 7). Finally, the free section which is disposed between both work plates 20a, 20b, is threaded with pile threads. In this case, there is employed an intermediate strip 19 for the work plates, said strip being provided with thread holes 3.

It is also possible to work without backing material. In such a case a strip 1f is wrapped about the work plates and the forward surfaces and pile threads 4 are drawn through it (FIG. 10).

FIGS. 8 and 9 illustrates the simultaneous making of a pair of individual rug sections. Two work plates 20c, 20b or 20e, 20f, which are respectively covered with backing material sections 1b, 1c or 1d, 1e, are laid one against the other and are threaded with pile threads 4. After securing the pile thread loops 5, the pile threads are cut through between the work plates, whereby a pair of similar rugs are obtained. With different thicknesses of work plates 20b, 20c (FIG. 8), the upper rug has longer pile threads than the lower rug. As shown in FIG. 9, the two rugs have an equal pile height. The joining of the work plates at their forward sides may also be effected, by means of a self-adhering sheeting. A precision measured in millimeters may be effected by first aligning the workplates by means of dowel pins which may be inserted into aligned bores. The dowel pins are not shown.

FIG. 11 illustrates a further possibility for joining partial pieces. The plates 20g are mounted on the plates 20h. The backing material sections 1g of the work plates 20g overlap the work plates 20h. The threads bind the backing material sections 1g and 1h to one another. The backing material, which is doubled, may additionally be secured using a glueing device. FIG. 12 illustrates a work plate 20k which is covered with a pair of cut-resistant synthetic sheets 10a 10b, so that the separating knife 14 may be guided with precision between both sheets during the cutting of the pile threads. FIG. 13 illustrates the corresponding employment of a pair of sheets 10c and 10d with two work plates 20l and 20m.

In FIG. 14, there is shown, in section, a work plate provided with pile thread holes 31 which are covered with a backing material 32 on one side. On the other side the work plate may be covered in any desired manner, particularly in section A, with an elastic sheet 33a and in section B with a sheet 33b covered with repeated hook-like short clips. In sections C, D, there are provided between the sheet 33a (C) and the spotted sheet 33b (D) and the work plate 30, cut-resisting sheets 34, 35. The pile threads 4 are inserted in a loop-like shape in the thread holes 31 and in the sheets 33a and b in the direction of the arrow. As seen in section B it is possible also to insert simultaneously U-shaped individual threads 38 and 38a in two thread holes.

I claim:
1. Method of making pile thread rugs, comprising repeatedly passing in opposite directions a continuous length of pile thread through adjacent perforations in a plate member having a thickness corresponding to the length of the desired pile to thereby form a plurality of rows of loops on both sides of the plate member, glueing together the loops on one side of the plate member to form a pile thread web, severing the loops on the other side of the plate member along a predetermined plane and withdrawing the thread web from the plate member.

2. Method according to claim 1, wherein the thread is of single thickness.

3. Method according to claim 1, further including the step of covering the glued together loop web unit with a covering fabric.

4. Method of making pile thread rugs, comprising threading back and forth a continuous length of pile thread through consecutively spaced aligned holes of a pair of superimposed plates having a thickness corresponding to the length of the desired pile, to thereby form a plurality of thread loops, glueing together the adjacent loops on either side of the plates, slicing the thread intermediate the adjacent surfaces of the plates, and withdrawing the sliced thread including the glued together loops from each of the respective plates.

5. Method according to claim 4, further including the step of providing a plurality of dowel pins and aligning the plates by inserting the pins in predetermined holes of the plates.

6. Method according to claim 1, further including the step of providing a backing material having marks according to a desired pattern adjacent the plate side where the loops are glued together.

7. Method according to claim 6, wherein said backing material web is detachable from the plate.

8. Method according to claim 6, wherein said backing material web is provided with an outwardly extending edge projecting from said plates, said edge being adapted to be joined to a similar edge of another web.

References Cited
UNITED STATES PATENTS

| | | | |
|---|---|---|---|
| 207,141 | 8/1878 | Smith | 112—266 |
| 1,653,936 | 12/1927 | Wagner | 83—442 |
| 2,495,666 | 1/1950 | Taubert | 156—72 X |
| 2,587,498 | 2/1952 | Marsh | 209—408 |
| 2,695,621 | 11/1954 | Cox | 112—80 X |
| 2,983,028 | 5/1961 | Cole | 112—79 X |
| 3,162,080 | 12/1964 | Hemker | 83—443 X |
| 3,240,176 | 3/1966 | Morrison | 112—80 X |
| 3,278,363 | 10/1966 | Couquet | 156—72 X |
| 3,359,934 | 12/1967 | Schwartz et al. | 156—72 X |
| 3,121,679 | 2/1964 | Newburg | 209—233 |
| 3,385,751 | 5/1968 | Willard et al. | 112—266 X |

HAROLD ANSHER, *Primary Examiner.*

U.S. Cl. X.R.

83—442; 112—80, 227, 266, 410; 156—93, 435; 209—408